(12) United States Patent
Yang et al.

(10) Patent No.: US 12,420,955 B2
(45) Date of Patent: Sep. 23, 2025

(54) MULTI-MODAL MULTI-OBJECTIVE TESTING DATA GENERATION METHOD BASED ON TOPOLOGY ADAPTIVE RESONANCE THEORY

(71) Applicant: Beihang University, Beijing (CN)

(72) Inventors: Shunkun Yang, Beijing (CN); Qi Yao, Beijing (CN); Zhiyu Duan, Beijing (CN); Qi Shao, Beijing (CN)

(73) Assignee: Beihang University, Beijing (CN)

( * ) Notice: Subject to any disclaimer, the term of this patent is extended or adjusted under 35 U.S.C. 154(b) by 0 days.

(21) Appl. No.: 18/731,749

(22) Filed: Jun. 3, 2024

(65) Prior Publication Data

US 2024/0317426 A1    Sep. 26, 2024

(30) Foreign Application Priority Data

Jan. 26, 2024    (CN) .......................... 202410112127.6

(51) Int. Cl.
*B64F 5/60*    (2017.01)
*G06F 17/11*    (2006.01)

(52) U.S. Cl.
CPC .................. *B64F 5/60* (2017.01); *G06F 17/11* (2013.01)

(58) Field of Classification Search
CPC ....... B64F 5/60; G06F 17/11; G05B 23/0243; G05B 2219/24065; G06N 3/006
See application file for complete search history.

(56) References Cited

U.S. PATENT DOCUMENTS

| | | | | |
|---|---|---|---|---|
| 11,249,887 | B2 * | 2/2022 | Xu | G06N 3/08 |
| 11,899,566 | B1 * | 2/2024 | Singh | G06F 11/3684 |
| 2009/0112780 | A1 * | 4/2009 | Chen | G06F 11/3409 706/19 |
| 2011/0107307 | A1 * | 5/2011 | Liu | G06F 11/3698 717/130 |
| 2014/0365830 | A1 | 12/2014 | Rajan et al. | |

(Continued)

OTHER PUBLICATIONS

Translation of allowed claims of CN202410112127.6 (only claims are translated).

(Continued)

*Primary Examiner* — Mussa A Shaawat
(74) *Attorney, Agent, or Firm* — Hemisphere Law, PLLC; Zhigang Ma

(57) ABSTRACT

A multi-modal multi-objective testing data generation method based on topology adaptive resonance theory is disclosed. The method considers that that the test aircraft under what kind of external disturbance or its own system fault conditions will be close to multiple index thresholds of unreliable or unsafe state at the same time as a black box optimization testing problem. The testing data is generated through optimization algorithms to test the aircraft state under different disturbance conditions. This type of black box optimization problem belongs to multi-modal multi-objective optimization problems. The testing problem can be solved using a multi-modal multi-objective particle swarm optimization algorithm based on adaptive resonance topology network. The external disturbance variable parameter combination encountered by the aircraft is regarded as the particle position, and the optimal parameter combination is found by iteratively updating the particle position.

9 Claims, 9 Drawing Sheets

(56) References Cited

U.S. PATENT DOCUMENTS

| | | | |
|---|---|---|---|
| 2015/0095895 A1* | 4/2015 | Taneja | G06F 11/3684 717/132 |
| 2017/0131700 A1* | 5/2017 | Li | G06N 20/00 |
| 2018/0089148 A1* | 3/2018 | Li | F04B 51/00 |
| 2018/0357145 A1* | 12/2018 | Sarangapani | G06F 11/368 |
| 2019/0087311 A1* | 3/2019 | Donaldson | G06F 11/3688 |
| 2019/0197244 A1* | 6/2019 | Fong | G06N 20/00 |
| 2019/0311215 A1* | 10/2019 | Andersson | G06F 18/2113 |
| 2019/0377736 A1* | 12/2019 | Balasubramanian | G06F 11/3692 |
| 2020/0019493 A1* | 1/2020 | Ramakrishna | G06F 8/20 |
| 2020/0019824 A1* | 1/2020 | Collins | G06N 3/08 |
| 2020/0097853 A1* | 3/2020 | Golovin | G06N 5/01 |
| 2020/0111018 A1* | 4/2020 | Golovin | G06F 11/3006 |
| 2020/0111578 A1* | 4/2020 | Koblick | G16H 80/00 |
| 2020/0143243 A1* | 5/2020 | Liang | G06N 3/086 |
| 2020/0284883 A1* | 9/2020 | Ferreira | G01S 7/4815 |
| 2020/0364507 A1* | 11/2020 | Berry | G06F 18/217 |
| 2020/0410370 A1* | 12/2020 | Bienstman | G06N 5/04 |
| 2021/0279165 A1 | 9/2021 | Rubin | |
| 2021/0303448 A1* | 9/2021 | Subramanian Rajalakshmi | G06F 11/3698 |
| 2022/0043740 A1 | 2/2022 | Rubin | |
| 2022/0044119 A1* | 2/2022 | Wang | G06N 3/045 |
| 2022/0108215 A1* | 4/2022 | Choromanski | G06F 17/11 |
| 2022/0171727 A1* | 6/2022 | Ghosal | G06N 3/006 |
| 2024/0054233 A1* | 2/2024 | Ohayon | G06F 21/577 |
| 2024/0118702 A1* | 4/2024 | Cella | G06Q 10/0635 |
| 2024/0411663 A1* | 12/2024 | Sarva | G06F 30/27 |
| 2025/0169734 A1* | 5/2025 | Dawson | A61B 5/1124 |

OTHER PUBLICATIONS

CNIPA, Notification of First Office Action for Chinese application CN202410112127.6, Jul. 26, 2024.

CNIPA, Notification to grant patent right for Chinese application CN202410112127.6, Sep. 25, 2024.

* cited by examiner

MULTI-MODAL MULTI-OBJECTIVE TESTING DATA GENERATION METHOD BASED ON TOPOLOGY ADAPTIVE RESONANCE THEORY

TECHNICAL FIELD

The present disclosure provides a multi-modal multi-objective testing data generation method based on topology adaptive resonance theory, belonging to the field of multi-modal multi-objective optimization algorithms and black box optimization testing technology.

BACKGROUND ART

When the aircraft suffers from external disturbance or its own system fault during flight, because the aircraft has stability and is equipped with auto drive system, which can resist a certain degree of disturbance or fault, it is often difficult to estimate the state of the aircraft after disturbance or system fault during flight, so it is necessary to test the flight response of the aircraft under different degrees of disturbance or system fault. Considering the diverse structures, different control laws, and close software-hardware coupling of different aircrafts, the aircraft during flight can be regarded as a black box, without paying attention to the internal control logic and flight dynamics principles of the aircraft, and when a given intensity of external disturbance or a certain degree of system fault is input, and the flight state based on certain specific indexes can be judged. The indexes used to determine the flight state of aircraft are often not single, such as altitude, velocity, angle of attack, etc. It is necessary to refer to multiple indexes to evaluate the flight state at the same time. Therefore, it is particularly important to find the disturbance conditions that make each index reach the unreliable or unsafe state threshold. For different indexes, the disturbance conditions that make them reach the unreliable or unsafe state threshold are often different, and some targets may even conflict with each other. To achieve such targets simultaneously, such problems need to be regarded as multi-objective optimization problems. In addition, for the same flight state index, the disturbance variable combination that reach the abnormal state threshold may also be different. To find the disturbance variable combinations that make multiple indexes reach an unreliable or unsafe state, in addition to considering multi-objective optimization, it is also necessary to consider the multi-modal characteristics of the variable space, that is, such problems are considered as multi-modal multi-objective optimization problems.

There are generally two mainstream solutions for black box optimization testing problems, one is Bayesian optimization method, and the other is heuristic algorithms such as genetic algorithm, differential evolution algorithm, and particle swarm optimization algorithm. For black box optimization testing problems with multiple objectives, multi-objective optimization algorithms can be used to solve them. However, most methods only focus on finding the Pareto front in the target space, and ignore that points on the same Pareto front may correspond to multiple variable combinations in the decision space, that is, the same functional value may correspond to multiple solutions. If black box optimization testing problems are only regarded as multi-objective optimization problems, the diversity of solutions in the decision space may be ignored and it cannot provide more feasible solutions for the problem. Instead, some black box optimization problems are regarded as multi-modal multi-objective optimization problems, and the heuristic algorithms are used to explore the Pareto optimal solution set of these problems, which provides a more comprehensive idea for solving this kind of problems.

To solve multi-modal multi-objective optimization problems, currently proposed optimization algorithms mainly include Pareto based, decomposition based, and index based algorithms. Considering the multi-modal characteristics of decision space, some studies based on Pareto dominance methods apply the niching method to locate multiple optimal solutions. However, the classical niching method is extremely sensitive to parameter values. Therefore, a particle swarm multi-modal multi-objective optimization algorithm based on circular topology to form a stable niching has been proposed. This algorithm does not need to define any niching parameters, but the circular topology is obtained by sequentially connecting particles in the decision space head to tail, and cannot reflect the true topological structure of particle distribution in space. When solving multi-modal multi-objective problems, the neighborhood information reflected by the topology of the optimal solution plays an important role in local search. Inspired by the characteristics of multi-modal multi-objective optimization problems and the neighborhood characteristics of self-organizing mapping networks, some have proposed a multi-modal multi-objective particle swarm optimization algorithm based on self-organizing mapping. However, this method requires pre-defined topology information such as the number of nodes, node arrangement, and node connection methods, which often requires prior knowledge of the problem to be solved. In reality, it is often difficult to obtain this knowledge in advance, making this method highly limited.

Therefore, a new perspective is provided, which regards the problem of finding disturbance variable values that make multiple flight state indexes reach the unreliable state threshold at the same time as a black box optimization testing problem. And based on this new perspective, providing a multi-modal multi-objective particle swarm optimization algorithm based on this new perspective without the need to define the topology structure in advance, and utilizing this algorithm to achieve targeted rapid generation of testing data, is an urgent problem that technical personnel in this field need to solve.

SUMMARY

In view of this, the present disclosure proposes a multi-modal multi-objective testing data generation method based on topology adaptive resonance theory. The method considers that the test aircraft under what kind of external disturbance or its own system fault conditions will be close to multiple index thresholds of unreliable or unsafe state at the same time as a black box optimization testing problem. The testing data is generated through optimization algorithms, namely the disturbance variable parameter combination, to test the aircraft state under different disturbance conditions. This type of black box optimization problem belongs to multi-modal multi-objective optimization problems. The testing problem can be solved using a multi-modal multi-objective particle swarm optimization algorithm based on adaptive resonance topology network. The external disturbance variable parameter combination encountered by the aircraft is regarded as the particle position, and the optimal parameter combination is found by iteratively updating the particle position. This algorithm utilizes an adaptive resonance topology network to incrementally learn the distribution of the Pareto optimal solution set without the need for predefined topology network structure information, which provides neighborhood information for the iterative updates of particles in the particle swarm algorithm, further guiding the update direction of the particle swarm. Then, the Pareto optimal solution in the updated position of the particles is input into the adaptive resonance topology network, which makes the topology structure of the network closer to the true distribution of the Pareto optimal solution set as the particle swarm iterates, while ensuring the convergence of multi-modal multi-objective algorithms and exploring the diversity of decision space solutions. After iteration, each generation of particles is compared with the test data archive to remove duplicate particles, and the final retained data is the testing data generated by this iteration, which is the value combination for aircraft disturbance variables or system fault factors that need to be tested. The disclosure can quickly find out the value boundary of disturbance variables that distinguish the reliable and unreliable states of aircraft by using less test data and shorter test time under some conditions of limited test times or high test cost.

In order to achieve the above objectives, the present disclosure adopts the following technical solution:

A multi-modal multi-objective testing data generation method based on topology adaptive resonance theory is provided, including the following steps:

Step 1: determining disturbance variables that affect flight state and their range of values, as well as multiple indexes and their thresholds used to distinguish the flight state;

Step 2: transforming a testing problem into a multi-modal multi-objective black box optimization testing problem and building an automatic testing environment;

Step 3: setting relevant parameters of the particle swarm optimization algorithm and initializing the particle swarm;

Step 4: building a test data archive, a testing dataset, an external set, a learning set, and an individual optimal set;

Step 5: inputting the learning set into an adaptive resonance topology network and updating a topology structure of the adaptive resonance network;

Step 6: updating a particle swarm position based on the updated adaptive resonance network topology and generating new testing data;

Step 7: updating the testing data, inputting the updated testing dataset into the automatic testing environment, calculating multi-objective function values, and updating the test data archive;

Step 8: updating the external set, learning set, and individual optimal set based on a non-dominated relationship of the updated particles; and Step 9: repeating the update process of the adaptive resonance network, the particle swarm, and the external set until termination conditions are met.

In step 1, the feature "determining disturbance variables that affect flight state and their range of values, as well as multiple indexes and their thresholds used to distinguish the flight state" is implemented as follows: D disturbance variables $var_1, var_2, \ldots, var_D$ that can affect an operational state of the aircraft and the value ranges of each factor: $var_1 \in [var_{1min}, var_{1max}]$, $var_2 \in [var_{2min}, var_{2max}]$, ..., $var_D \in [var_{Dmin}, var_{Dmax}]$ are obtained based on actual operating environment of the aircraft or human experience, such as the velocity and direction of gust encountered during the flight when encountering a gust. M relevant indexes $\{obj_1, obj_2, \ldots, obj_M\}$ that can reflect changes in flight state are obtained, such as altitude, velocity, and angle of attack.

These indexes can vary with the impact of disturbance variables on the flight state. When one of the indexes reaches its threshold, the flight state transitions from a reliable or safe state to an unreliable or unsafe state, and the threshold of each index is determined by relevant requirements for the reliable and safe operation of the aircraft.

In step 2, the described "transforming a testing problem into a multi-modal multi-objective black box optimization testing problem and building an automatic testing environment" is implemented as follows: firstly, it is required to convert the testing problem into a multi-mode multi-target black box optimization testing problem, without paying attention to the structure and control law of the aircraft to be tested, its output is observed only based on different inputs, the input is a parameter combination of various disturbance variables or system faults encountered by the aircraft during flight, the output is index values of the flight state, a degree of disturbance or what kind of faults will cause the aircraft to be unreliable or unsafe is considered as a black box optimization testing problem, multiple flight state indexes close to their respective unreliable or unsafe thresholds are set as an optimization objective, and values of the disturbance variables are set as a decision space; to construct a multi-modal multi-objective black box optimization problem, generally speaking, the problem is expressed as follows:

$$\text{Min} F(\text{var}) = \{f_1(\text{var}), f_2(\text{var}), \ldots, f_M(\text{var})\}$$

$$\text{s.t. var} = (\text{var}_1, \text{var}_2, \ldots, \text{var}_D) \in \Omega$$

among them, F represents a proximity function between the flight state and the unreliable state boundary, the smaller the value of F, the closer the flight state is to the unreliable state, at the edge of impending anomalies, the flight state is determined by various flight state indexes f (var), M represents the number of targets to be optimized, that is, the number of flight state indexes; var represents a D-dimensional vector in the decision space, that is, a vector composed of D disturbance variables or system fault factors.

It should be Noted that:

Decision space refers to the space formed by the range of values of each variable among all decision variables; target space refers to the space formed by mapping decision variables within a certain range of values to the objective function.

The traditional multi-objective optimization problem only focuses on finding the Pareto frontier distribution in the target space, without considering the diversity of solutions in the decision space. By constructing a multi-modal multi-objective black box optimization problem, our optimization goal not only needs to find a uniformly distributed Pareto frontier in the target space, but also needs to find multiple Pareto optimal solution sets corresponding to the Pareto frontier in the decision space, that is, different combinations of disturbance variable values.

It should be Noted that:

The definition of Pareto optimal solution is: for any two solutions $x_A$ and $x_B$, if $x_A$ is not inferior to $x_B$ in all objectives and is better than $x_B$ in at least one objective $x_A$, it is called $x_A$ dominating $x_B$. When a solution is not dominated by any other solution, it is called a Pareto optimal solution. The Pareto optimal solution set is the set of these optimal solutions in the decision space, and the Pareto front is the projection of the Pareto solution set in the objective space.

After constructing the multi-modal multi-objective black box optimization testing problem, it is necessary to build an automatic testing environment. Due to the difficulty and high testing cost of constructing the flight scenario of a real aircraft, the testing scenario of the present disclosure is based on flight simulation software. The flight simulation software is used to simulate the scenario of a real aircraft encountering similar disturbance or system faults during flight, which reflects real-time changes in key flight parameters or indexes. The automatic testing environment generally consists of three parts: test control module, test execution module, and test result collection module. Among them, the test control module is responsible for obtaining the testing data generated by the optimization algorithm, the test execution module inputs the testing data into the system to execute the test, and the test result collection module collects the corresponding test results of each testing data and feeds the results back to the optimization algorithm.

In step 3, the described "setting relevant parameters of the particle swarm optimization algorithm" is to solve the multi-modal multi-objective problem mentioned in step 2, it is necessary to find the Pareto optimal solution set of the problem. The multi-modal multi-objective particle swarm optimization algorithm can be used to search, and the external disturbance variable parameter combination ($var_1$, $var_1$, ..., $var_D$) encountered by the aircraft can be regarded as the D-dimensional particle position coordinates. By iteratively updating the particle position, new disturbance variable parameter combinations are continuously generated. These new disturbance variable combinations are testing data, which are input into the testing environment to obtain the corresponding aircraft state indexes under different disturbance conditions, and the optimal disturbance variable parameter combination is found. The relevant parameters of particle swarm optimization algorithm mainly include: number of particles N, particle dimension D, inertia factor w, learning factors $c_1$ and $c_2$. The particle dimension D corresponds to the number of disturbance variables or system fault factors in step 1, and these parameters can be set based on actual problem requirements, previous experience, and some preliminary experiments.

In step 3, the described "initializing the particle swarm" includes: randomly generating N particles in the D-dimensional decision space, and initializing the velocity $V_i$ and position $X_i$ of the i-th particle, wherein $V_i=(V_i^1, V_i^2, \ldots, V_i^D)$, $X_i=(var_i^1, var_i^2, \ldots, var_i^D)$, the position of the particle corresponds to the value of the disturbance variable combination during the flight process.

In step 4, the described "testing data archive", TA, refers to the data archive used to store all the data that has been input into the simulation automatic testing environment for testing, the testing data refers to the disturbance variable parameter combination generated after particle iteratively updates the position. The main function of the testing data archive is to compare with the newly generated testing data, to prevent the same testing data from being inputted into the automatic testing environment again, and to avoid duplicate testing; "testing dataset", TS, refers to the dataset that will be inputted into the testing environment for testing, and "external set, learning set, and individual optimal set" are all used to store Pareto optimal solutions, that is, the combinations of multiple index thresholds in the generated disturbance variable parameter combinations that make the aircraft closer to the critical states of reliability and unreliability; the external set EA is used to store all Pareto optimal solutions of each generation of particle swarm after update, the learning set LS is used to store the newly added Pareto optimal solutions relative to the previous iteration of the external set. Each particle has its own individual optimal set $Pbest_i$, and the individual optimal set is used to store the Pareto optimal solutions in all iterative updates of each particle.

In step 4, the described "building a test data archive, a testing dataset, an external set, a learning set, and an individual optimal set" is implemented as follows: empty sets of each archive and set are built in the initial stage before the algorithm starts iteration, and then the initialized positions of all particles are input into the test data archive, testing dataset, external sets, and learning set, that is, TA={$X_1$, $X_2$, ..., $X_i$, ..., $X_N$} TS={$X_1$, $X_2$, ..., $X_i$, ..., $X_N$}, EA={$X_1$, $X_2$, ..., $X_i$, ..., $X_N$}, LS={$X_1$, $X_2$, ..., $X_i$, ..., $X_N$}, and the positions of each particle are input into its own individual optimal set, that is, $Pbest_1$={$X_1$}, $Pbest_2$={$X_2$}, ..., $Pbest_i$={$X_i$}, ..., $Pbest_N$={$X_N$}, in the later stage, as the particle swarm updates, each archive and set will also be updated.

In step 5, the described "adaptive resonance topology network" refers to a topology network constructed based on adaptive resonance theory, consisting of nodes and edges connecting nodes. During its construction process, the data input to the network with high similarity is classified into the same node representation. By utilizing the characteristic that the adaptive resonance topology network can incrementally learn the neighborhood features of the data distribution, the updated learning set of each generation is input into the adaptive resonance topology network. The adaptive resonance topology network is used to learn the distribution of the Pareto optimal solution set, thereby providing neighborhood information for better iterative updates of the particle swarm and enabling the algorithm to find the Pareto optimal solution set more quickly, which is the disturbance variable parameter combination of multiple index thresholds that make the aircraft closer to a critical state of reliability and unreliability. The similarity of input data in the adaptive resonance topology network is quantified by the correlation entropy induced metric (CIM), and the input data is the new Pareto optimal solution generated by this generation of particle swarm iteratively updating the position. The calculation formula for the correlation entropy induced metric of two input data $a=(a_1, a_2, \ldots, a_D)$ and $b=(b_1, b_2, \ldots, b_D)$ is:

$$CIM(a, b, \sigma) = \left[\frac{1}{\sigma\sqrt{2\pi}}\left(1 - \frac{1}{D}\sum_{d=1}^{D} e^{\frac{(a_d-b_d)^2}{2\sigma^2}}\right)\right]^{\frac{1}{2}}$$

Among them, $\sigma$ represents the kernel bandwidth of the Gaussian kernel, D represents the dimension of the input data, and the smaller the value of the correlation entropy induced metric, the higher the similarity between the two input data.

In step 5, for the "inputting the learning set into an adaptive resonance topology network and updating a topology structure of the adaptive resonance network", the learning set is used to store a new Pareto optimal solution generated by the iteration of the particle swarm after updating the position, that is, a disturbance variable parameter combination of multiple index thresholds that make the aircraft closer to a critical state of reliability and unreliability, and a construction and update process of the adaptive resonance topology network includes following steps:

(1) Initialization: in an initial stage of constructing the adaptive resonance topology network, since there are no nodes in the network, the first two data points in the input network become nodes directly, the input data is the Pareto optimal solution in the learning set, which is the disturbance variable parameter combination of multiple index thresholds that make the aircraft closer to a critical state of reliability and unreliability. The generation of other new nodes needs to be determined by calculating the entropy induced metric between the input data and the nodes. The calculation of the correlation entropy induced metric is influenced by a kernel bandwidth σ, which is a data related parameter estimated from the top H data in the input network:

$$\sigma_d = \left(\frac{4}{2+D}\right)^{\frac{1}{4+D}} S_d H^{-\frac{1}{4+D}}$$

among them, $\sigma_d$ is a d-th dimensional kernel bandwidth, $S_d$ represents a d-th dimensional sample standard deviation of H data points input into the adaptive resonance topology network, and a median of an array composed of the kernel bandwidths in each dimension is the node's kernel bandwidth σ.

(2) Winning node selection: when data point $x_i=(x_i^1, x_i^2, \ldots, x_i^D)$ is input into the adaptive resonance topology network, the correlation entropy induced metric between it and the existing node $Y=\{y_1, y_2, \ldots, y_j\}$ is first calculated, where $y_j=(y_j^1, y_j^2, \ldots, y_j^D)$, the winning node is selected based on a size of the correlation entropy induced metric:

$$w_1 = \underset{y_j \in Y}{\mathrm{argmin}}[CIM(x_i, y_j, \sigma)]$$

$$w_2 = \underset{y_j \in Y\setminus\{y_{w_1}\}}{\mathrm{argmin}}[CIM(x_i, y_j, \sigma)]$$

among them, $w_1$ and $w_2$ represent indexes of the first winning node and the second respectively, and the parameter $y_{w_1}$ represents the first winning node.

(3) Warning value test: a similarity between the data point and the first and second winning nodes is represented as:

$$V_{w_1} = CIM(x_i, y_{w_1}, \sigma)$$

$$V_{w_2} = CIM(x_i, y_{w_2}, \sigma)$$

among them, $y_{w_2}$ represents the second winning node.

The similarity is compared with predefined warning value V and a relationship between data point and nodes is divided into following three situations:

$$V_{w_2} > V_{w_1} > V \qquad 1)$$

this situation means that the similarity between the data point and the winning node is greater than the warning value, that is, the winning node does not match the data point, and in this case, a new node needs to be generated, which is represented as:

$$y_{j+1} = x_i$$
$$V_{w_1} \leq V < V_{w_2} \qquad 2)$$

this situation means that the data point matches the first winning node, but does not match the second winning node;

$$V_{w_1} \leq V_{w_2} \leq V \qquad 3)$$

this situation means that the data point matches the first and second winning nodes, a process of node learning and edge connection is performed;

(4) Node Learning and Edge Connection when the data point matches the node, the node state is updated, and if the first and second winning nodes satisfy situation 2), the position of the first winning node is updated using the following formula:

$$y_{w_1} = y_{w_1} + \frac{1}{M_{w_1}}(x_i - y_{w_1})$$

among them, $M_{w_1}$ is the number of data points belonging to node $y_{w_1}$. Whenever a new data point matches node $y_{w_1}$, $M_{w_1}$ is updated using the following formula:

$$M_{w_1} = M_{w_1} + 1$$

when the first and second winning nodes satisfy situation 3), nodes $y_{w_1}$ and $M_{w_1}$ are updated in the same way as situation 2), and if there is no edge connection between the first and second winning nodes, a new edge is generated to connect the first and second winning nodes, all neighboring nodes $y_{neighbor}$ connected to the first winning node $y_{w_1}$ through an edge are updated using the following formula:

$$y_{neighbor} = y_{neighbor} + \frac{1}{10M_{neighbor}}(x_i - y_{neighbor})$$

among them, M represents the number of data points belonging to node $y_{neighbor}$.

Through the above four steps, an adaptive resonance topology network consisting of nodes and edges of connecting nodes can be constructed. This topology network can continuously update its number of nodes and node connection methods as new data is input, thereby reflecting the distribution of data more quickly and accurately. Here, the adaptive resonance topology network is used to learn the distribution of disturbance variable parameter combinations of multiple index thresholds that make the aircraft closer to a critical state of reliability and unreliability in the decision space, which provides neighborhood information for particle swarm updates, and thus more such disturbance variable parameter combinations are generated faster.

In step 6, the described "updating a particle swarm position based on the updated adaptive resonance network topology and generating new testing data" is implemented as follows:

(1) mapping the external set to the adaptive resonance topology network and finding nodes corresponding to the Pareto optimal solution in each external set;

(2) mapping particles to the adaptive resonance topology network, finding the belonging nodes of each particle, and then finding neighboring nodes of the belonging nodes of each particle based on the adaptive resonance topology network;

(3) forming a neighborhood solution set by the Pareto optimal solutions of the external set contained in the belonging nodes of each particle and the neighboring nodes of the belonging nodes, sorting solutions in the neighborhood solution set based on a crowding degree of the particle in the decision space and the corresponding function value in a target space, wherein a first ranked solution is a neighborhood optimal solution $X_{nbest_i}$ of the particle;

(4) sorting solutions in the individual optimal set of the particle according to a crowding degree, wherein a first ranked solution is an individual optimal solution $X_{pbest_i}$ of the particle; and (5) updating a velocity and a position of each particle based on its individual optimal solution and neighborhood optimal solution, and the update formula is as follows:

$$V_i(t+1) = w * V_i(t) + c_1 r_1 (X_{pbest_i} - X_i(t)) + c_2 r_2 (X_{nbest_i} - X_i(t))$$

$$X_i(t+1) = X_i(t) + V_i(t+1)$$

among them, $V_i(t+1)$ represents the velocity of the i-th particle in the t+1 generation, $X_i(t+1)$ represents the position of the i-th particle in the t+1 generation, $V_i(t)$ represents the velocity of the i-th particle in the 1-th generation, $X_i(1)$ represents the position of the i-th particle in the t-th generation, and $r_1$ and $r_2$ are two random variables within the range of (0,1).

In the above steps, the first three steps are to use the constructed adaptive resonance topology network to provide neighborhood information for the particle swarm, that is, to find the neighborhood solution set of each particle. The neighborhood solution contained in this solution set can guide the position update of each particle together with the individual optimal solution of each particle found in the fourth step, so that the particles can update their positions towards multiple index thresholds that make the aircraft closer to a critical state of reliable and unreliable critical states. The new particle positions are the testing data generated in this iteration, which is a combination of several values of disturbance variables that affect the flight state.

It should be Noted that:

The crowding distance in decision space refers to an index of the degree of crowding between a particle and its neighboring particle in the decision space. The larger the crowding distance, the more dispersed the distribution of particles, and the better it can ensure the diversity of solutions.

The crowding distance in the target space refers to the degree of crowding between the objective function value of a particle and the function value of its neighboring particle in the target space. The larger the crowding distance, the more dispersed the distribution of the objective function value of the particle, and the more diverse the solution in the target space.

In step 7, the described "updating the testing data" is implemented as follows:

the previous generation testing dataset TS(t) is replaced with the updated particle positions, an intersection of the testing dataset and the solutions in the test data archive is found, then the intersection part in the testing dataset is deleted to obtain a remaining part, and the remaining part is the updated testing dataset TS(t+1).

In step 7, the described "inputting the updated testing dataset into the automatic testing environment, calculating multi-objective function values" is implemented as follows:

the updated testing dataset is input into the automatic testing environment, and actual operating results of the testing data are obtained through automatic testing execution, that is, a combination of values of different flight disturbance factors or system faults is input into flight simulation software to obtain the values of multiple flight state indexes under the influence of the disturbance or fault conditions, the results are used to calculate the values of the multi-objective function, that is, an absolute difference between the values of multiple flight state indexes and the corresponding unreliable thresholds of the flight state indexes.

In step 7, the described "updating the test data archive" is implemented as follows:

a tested current generation testing dataset TS(t+1) is put into a previous generation test data archive TA (t) to obtain an updated test data archive TA (t+1); all disturbance variable parameter combinations that affect the flight state of the aircraft that have been input into the automatic testing environment for testing up to this iteration.

In step 8, the described "updating the external set, learning set, and individual optimal set based on a non-dominated relationship of the updated particles" is implemented as follows:

The update process of the external set RA includes: merging all particles after updating the position into the external set, and performing fast non dominated sorting on the solutions in the external set, retaining the Pareto optimal solutions and removing the dominated solutions. The updated external set includes all disturbance variable parameter combinations of multiple index thresholds that make the aircraft closer to a critical state of reliability and unreliability, as of this iteration.

The update process of learning set LS includes: finding an intersection of the external set EA(t+1) of the current generation and the external set EA(t) of the previous generation, and then deleting the solutions of the intersection part of the external set of the current generation to obtain a remaining part which is the updated learning set. The updated learning set includes all newly generated disturbance variable parameter combinations of multiple index thresholds that make the aircraft closer to a critical state of reliability and unreliability, as of this iteration.

The update process of individual optimal set $Pbest_i$ includes: merging each particle with the updated position into the individual optimal set of that particle, performing fast non dominated sorting on the individual optimal set of each particle, retaining the Pareto optimal solutions, and removing the dominated solutions. The updated individual optimal set includes disturbance variable parameter combinations of multiple index thresholds that make the aircraft closer to a critical state of reliability and unreliability in the historical position of the particle, as of this iteration.

In step 9, the described "repeating the update process of the adaptive resonance network, the particle swarm, and the external set until termination conditions are met" is implemented as follows: as the particle swarm position is updated, the new learning set is input into the adaptive resonance topology network according to step 5 for incremental learning to update the topology structure of the adaptive resonance network. Then, according to steps 6-8, the particle position is updated, the new particle position is evaluated, the external set, learning set, and individual optimal set are updated, and the iteration is repeated continuously until the termination condition is met. The termination condition is generally the specified number of iterations or the obtained testing data meets a certain number.

From the above technical solution, it can be seen that the multi-modal multi-objective testing data generation method based on topology adaptive resonance theory provided by the present disclosure has the advantages over existing technologies in that:

Firstly, the present disclosure regards the problem of finding disturbance variable values that make multiple flight state indexes to simultaneously reach the unreliable flight state thresholds as a multi-modal multi-objective black box optimization testing problem. Compared with the multi-objective black box optimization testing problem, which only focuses on the diversity of target space solutions, the use of multi-modal multi-objective optimization algorithms to generate testing data can focus on both the diversity of target space solutions and the diversity of decision space solutions, and more comprehensively identify all disturbance variables or system fault factor combinations that cause the aircraft to approach unreliable flight states in the decision space.

Secondly, for the traditional multi-modal multi-objective particle swarm optimization algorithms based on self-organizing mapping (SOM), although its SOM network used to learn the distribution of Pareto optimal solutions is also composed of nodes and edges, the predefined topological structures are required, which includes the number of nodes, the arrangement of nodes, and the connection relationship between edges between nodes. This requires a certain understanding of the problem to be solved before constructing the SOM network. Moreover, when solving multi-modal multi-objective problems with discontinuous Pareto optimal solution sets, the network structure cannot be flexibly adjusted, and the trained network cannot reflect the true distribution of Pareto optimal solution sets. While, the connection relationship of the adaptive resonance topology network is gradually generated based on input information, without the need for predefined information, and can reflect neighborhood relationships more realistically based on learning updates. At the same time, compared with other incremental clustering methods, the adaptive resonance topology network has fewer parameters and faster convergence rate.

Thirdly, the present disclosure utilizes adaptive resonance theory to perform incremental clustering on the new non dominated solutions generated by the iterative particle swarm optimization algorithm, and constructs and continuously updates the adaptive resonance topology network, so that the adaptive resonance topology network can more accurately reflect the distribution of the Pareto optimal solution set. At the same time, the particle swarm algorithm can in turn use the particle neighborhood information provided by the adaptive resonance topology network to update the particle position and generate more promising solutions, which further improves the topology structure of the adaptive resonance network.

In addition, the testing data archive established by the present disclosure can be used to store all testing data that has been input into the testing environment for testing. After each generation of new testing data, the new testing data is compared with the existing testing data archive to avoid duplicate testing, which saves testing time, testing resources, and testing costs.

Finally, the present disclosure regards the reliable flight testing problem of aircraft under disturbance conditions as a multi-modal multi-objective black box optimization testing problem, and utilizes a multi-modal multi-objective particle swarm optimization algorithm based on adaptive resonance topology network to explore the diversity of decision space solutions while ensuring algorithm convergence. Under limited testing times or expensive testing costs, it can quickly generate testing data for target tasks with fewer testing data and shorter testing time, and quickly identify the values of disturbance variables that make multiple flight state indexes reach the unreliable flight state threshold. This is of great significance for ensuring the reliable and safe operation of aircraft.

DESCRIPTION OF THE ACCOMPANYING DRAWINGS

DETAILED DESCRIPTION OF THE EMBODIMENTS

Figure 1:
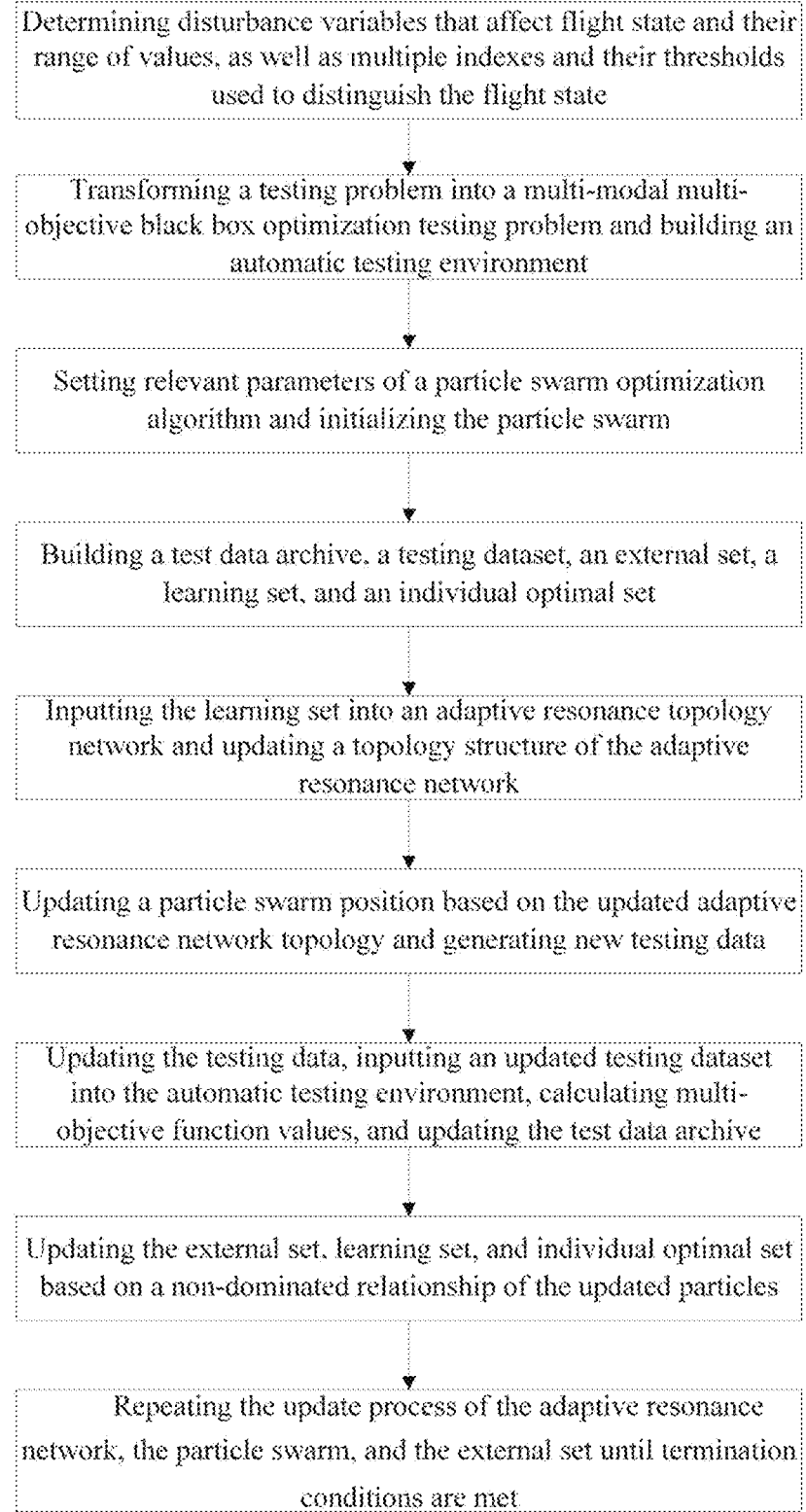
FIG. 1 shows the overall process flowchart of the multi-modal multi-objective testing data generation method based on topology adaptive resonance theory provided by the present disclosure.
Figure 2:
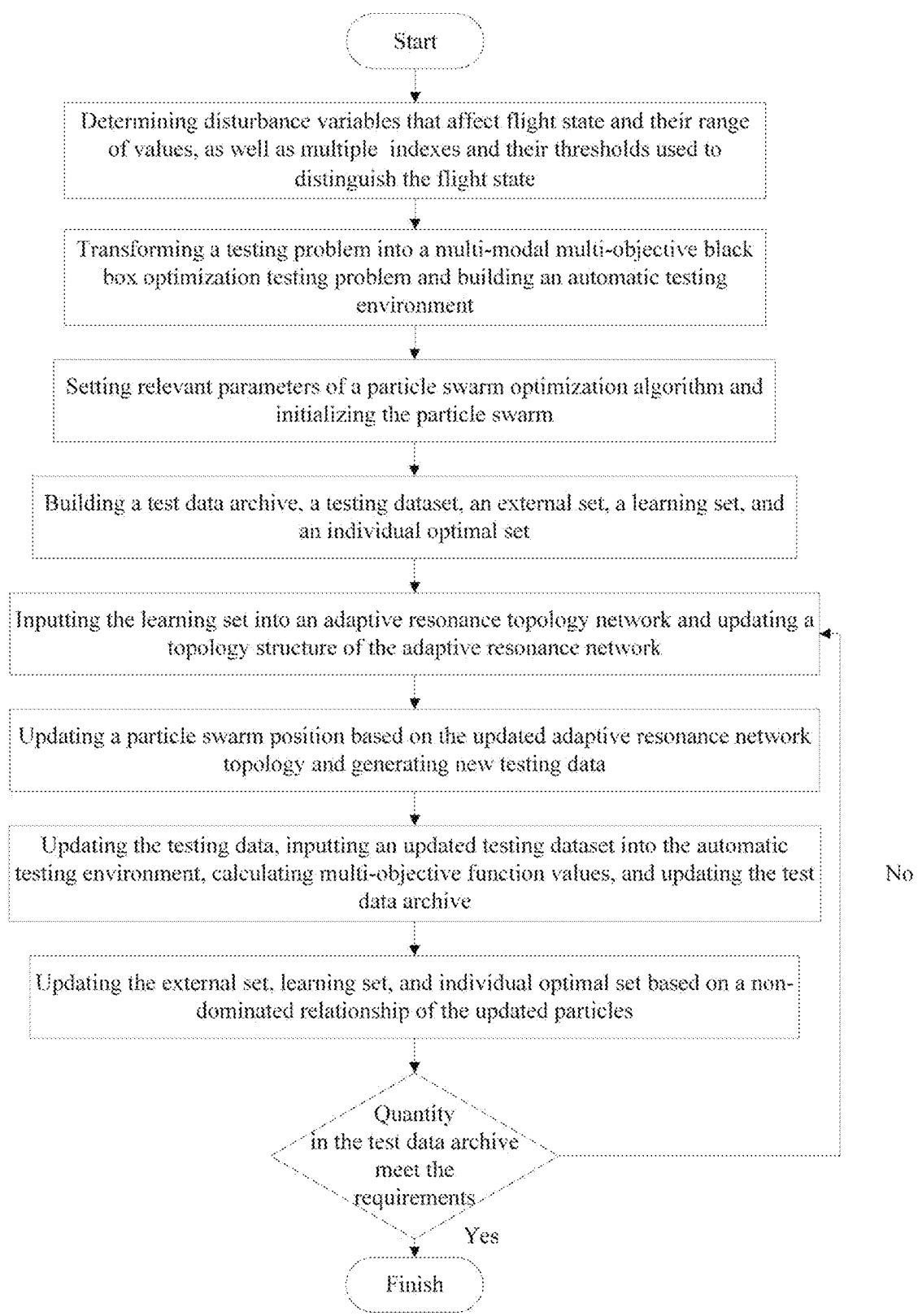
FIG. 2 shows the flowchart of the multi-modal multi-objective testing data generation method based on topology adaptive resonance theory provided by the present disclosure.

The present disclosure provides a multi-modal multi-objective testing data generation method based on topology adaptive resonance theory, which takes the specific scenario of an aircraft encountering gust disturbance during cruising as an implementation example. The method steps are shown in FIG. 1, and the specific process of the method is shown in FIG. 2. The specific content is as follows:

Step 1: determining disturbance variables that affect flight state and their range of values, as well as multiple indexes and their thresholds used to distinguish the flight state.

In this embodiment, the disturbance variables that affect the flight state of the aircraft are mainly the horizontal angle between the gust and the flight direction, and the gust velocity. Generally speaking, the larger the gust velocity, the greater the impact on the safe flight of the aircraft. The influence on aircraft safety flight is also different when the horizontal angle between gust and flight direction is different. In this embodiment, the range of values for the horizontal angle between the gust and the flight direction is [0, 180] (in degrees), and the range of values for the gust velocity is [0, 400] (in feet/second). In this embodiment, the indexes used to determine the flight state are selected as altitude and angle of attack. When the aircraft altitude is too low, strong airflow conversion in the troposphere can cause the aircraft to lose control, and low altitude meteorological conditions are complex, making it easy to encounter extreme weather such as storms and lightning. In addition, low altitude flight is also prone to bird strikes. If there is disturbance during flight and there is a significant change in altitude in a short period of time, on the one hand, it will pose a threat to the personal safety of passengers in the cabin, and on the other hand, the aircraft may enter the flight altitude of other aircraft, creating a risk of air collision. When the angle of attack of the aircraft is too large, it can cause risks such as stalling. According to the flight manual and regulations of the Civil Aviation Administration, the maximum threshold for altitude change in this embodiment is 100 feet, and the maximum angle of attack threshold is 19 degrees.

Step 2: transforming a testing problem into a multi-modal multi-objective black box optimization testing problem and building an automatic testing environment.

In this embodiment, because the aircraft itself has a certain degree of stability, can withstand a certain degree of gust impact, and the aircraft has an auto drive system, which can automatically correct the aircraft attitude and altitude, it is almost difficult to test and evaluate the aircraft encounter gust disturbance except for complex calculations or expensive wind tunnel experiments. The present disclosure transforms the problem into a multi-modal multi-objective black box optimization testing problem, without considering the aircraft structure and the control rate of aircraft autopilot. The scene of the aircraft encountering gust disturbance is considered as a black box, only considering what kind of gust disturbance will cause changes in flight altitude and angle of attack. The degree of the flight altitude and the angle of attack approach their respective thresholds at the same time after the gust disturbance is set as the optimization target, while gust direction and velocity are the disturbance variables that affect the flight altitude value and angle of attack value.

Figure 3:
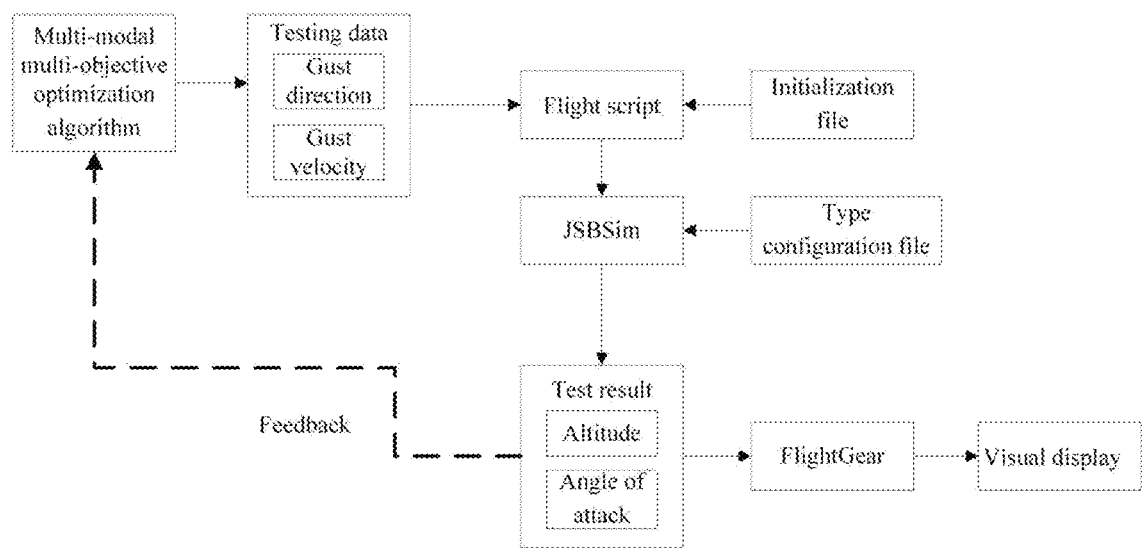
FIG. 3 is a schematic diagram of the automatic testing environment in the multi-modal multi-objective testing data generation method based on topology adaptive resonance theory provided by the present disclosure.

In this embodiment, since it is not possible to test the aircraft encountering gust disturbance in a real flight environment, flight simulation software is used for testing. The constructed automatic testing environment is shown in FIG. 3. Joint simulation is conducted using the flight dynamics model JSBSim and the visual flight simulation software FlightGear. Through testing scripts, various combinations of gust variables are input into the simulation testing environment to obtain the aircraft's flight altitude and angle of attack values under different disturbance conditions. JSBSim is an open-source 6-degree-of-freedom flight dynamics model that includes a complex flight physics/mathematics model, providing a realistic simulation of complex dynamic interactions between the aircraft body, propulsion system, atmosphere, aerodynamics, and flight control. FlightGear utilizes its rich interfaces and 3D real-time display functions to vividly display the motion state of the aircraft. By combining the characteristics of the two flight simulation software and using various pre written scripts, a real-time automatic flight visualization testing environment can be built.

The specific testing environment is constructed as follows: the initialization script is run in JSBsim, and the entire simulation model of the Cessna 172 aircraft cruises at a velocity of 100 feet per second at an altitude of 4000 feet, with a cruising angle of attack of 1 degree. At the same time, the flight disturbance script is run, and the gust disturbance is added in the fourth second of cruising. The direction of the gust ranges from [0, 180] (in degrees) to the horizontal angle of the flight direction, and the velocity range of the gust is [0, 400] (in feet per second). Each time a set of parameter combinations within the range of values is inputted, such as (30, 110), which represents a horizontal angle of 30° between the gust and the aircraft's flight direction, with a gust velocity of 110 feet per second. After 2 seconds of such gust disturbance, the current flight altitude and angle of attack values of the aircraft simulation model are obtained, which reflects the aircraft's flight state after being affected by gust disturbance. Then, this round of simulation test is over. When testing the next value combination of direction and velocity of gust, the test environment needs to be reinitialized and the test starts again. In the later stage, the value range of the direction and velocity of each gust generated by the optimization algorithm is a group of test data, which should be input into the environment through the automatic test script to obtain the output of the corresponding aircraft altitude and angle of attack. Then these outputs are used to calculate the fitness function of the optimization algorithm to further guide the generation of testing data.

Step 3: setting relevant parameters of a particle swarm optimization algorithm and initializing the particle swarm.

The multi-modal multi-objective particle swarm optimization algorithm is used to solve the multi-modal multi-objective black box optimization testing problem proposed in step 2. The direction and velocity values of gusts that interfere with the flight state of the aircraft are considered as the positions of particles in the particle swarm algorithm. Through continuous iterative updates, new combinations of direction and velocity values of gusts are optimized and generated. Firstly, the parameters related to the particle swarm are set: number of particles N, particle dimension D, inertia factor w, learning factors $c_1$ and $c_2$. Among them, the particle dimension D corresponds to the number of disturbance variables in step 1, which is 2. The total number of particles N is crucial to the performance of the algorithm. If the number of particles is too small, the diversity of the population will be insufficient to fully cover the decision space, resulting in poor decision performance. On the contrary, if the population size is too large, it will consume too much computing resources, so it is necessary to choose the appropriate total number of particles. This parameter needs to be set based on actual problem requirements, previous experience, and some preliminary experiments. In the experiment, the number of particles N is set to 10. The inertia weight w refers to the ability of a particle to maintain its motion state at the previous moment. The learning factors $c_1$ and $c_2$ are mainly used to control the degree to which the particle is influenced by individual cognition and social cognition. Generally, the value of w is 0.7298, and the values of $c_1$ and $c_2$ are both 2.05. The velocity $V_i$ and position $X_i$ of each particle are initialized. In this embodiment, the position of the particle represents the disturbance variable combination, and the two dimensions of the particle correspond to the direction and velocity of the gust, respectively. Therefore, the value range of the first dimension of the particle is $X_i^1 \in [0,180]$, and the value range of the second dimension is $X_i^2 \in [0,400]$. Within these ranges, the initial positions of 10 particles are randomly generated, such as $X_1=[3,200]$, $X_2=[45,351]$, . . . , $X_{100}=[18,185]$, and the initial velocity range of particles is $V_i^1 \in [-90,90]$ and $V_i^2 \in [-200,200]$. Within these ranges, the initial velocities of 10 particles are randomly generated, such as $V_1=[-65, 100]$, $V_2=[5,45]$, . . . , $V_{100}=[56,-155]$.

Step 4: building a test data archive TA, a testing dataset TS, an external set EA, a learning set LS, and an individual optimal set Pbest$_i$.

Testing data Archive (TA): used to store all data archives that have been input into the testing environment for testing, that is, all the combinations of direction and velocity values of gusts that have been input into the simulation testing environment to test the flight state of the aircraft;

Testing dataset (TS): used to store the dataset to be inputted into the testing environment for testing, that is, the combination of direction and velocity values of gusts to be inputted into the simulation testing environment for testing the flight state of the aircraft;

External set (FA): used to store the set of all Pareto optimal solutions generated by each generation of particle swarm updates, that is, all the combinations of direction and velocity values of altitude and angle of attack thresholds of gusts that make the aircraft closer to a critical state of reliability and unreliability, as of this iteration;

Learning set (LS): used to store the set of newly added Pareto optimal solutions relative to the external set of the previous iteration, which is the data to be input into the adaptive resonance topology network for incremental learning, that is, until this iteration, all the newly generated combinations of direction and velocity values of altitude and angle of attack thresholds of gusts that make the aircraft closer to a critical state of reliability and unreliability, as of this iteration;

Individual optimal set (Pbest$_i$): used to store the set of Pareto optimal solutions for each particle in all iteration updates, that is, in the historical positions of each particle, the combination of direction and velocity values of altitude and angle of attack thresholds of gusts that make the aircraft closer to a critical state of reliability and unreliability, as of this iteration.

In the initial stage, all initialized particle positions are inputted into the test data archive, testing dataset, external set, and learning set, that is, $TA=\{X_1, X_2, \ldots, X_i, \ldots, X_N\}$, $TS=\{X_1, X_2, \ldots, X_i, \ldots, X_N\}$, $EA=\{X_1, X_2, \ldots, X_i, \ldots, X_N\}$, $LS=\{X_1, X_2, \ldots, X_i, \ldots, X_N\}$ and the positions of each particle are inputted into its own individual optimal set, that is, $Pbest_1=\{X_1\}$, $Pbest_2=\{X_2\}$, . . . , $Pbest_i=\{X_i\}$, . . . , $Pbest_N=\{X_N\}$, as the particle swarm updates later, each archive and set will also be updated accordingly.

It should be Noted that:

The definition of Pareto optimal solution is: for any two solutions $x_A$ and $x_B$, if $x_A$ is not inferior to $x_B$ in all objectives and is better than $x_B$ in at least one objective $x_A$, it is called $x_A$ dominating $x_B$. When a solution is not dominated by any other solution, it is called a Pareto optimal solution. In this embodiment, the Pareto optimal solution is a combination of direction and velocity values of gusts that simultaneously bring the altitude and angle of attack of the aircraft closer to the thresholds of a critical state of reliability and unreliability. The more Pareto optimal solutions found, the more favorable it is for solving the multi-modal multi-objective black box optimization testing problem proposed in step 2.

Step 5: inputting the learning set into an adaptive resonance topology network and updating a topology structure of the adaptive resonance network.

Adaptive resonance topology network refers to a topology network constructed based on adaptive resonance theory, consisting of nodes and edges connecting nodes. During its construction process, the data input to the network with high similarity is classified into the same node representation. By utilizing the characteristic that the adaptive resonance topology network can incrementally learn the neighborhood features of the data distribution, the updated learning set of each generation is input into the adaptive resonance topology network. The adaptive resonance topology network is used to learn the distribution of the Pareto optimal solution set, thereby providing neighborhood information for better iterative updates of the particle swarm and enabling the algorithm to find the Pareto optimal solution set more quickly, which is the disturbance variable parameter combination of multiple index thresholds that make the aircraft closer to a critical state of reliability and unreliability. The similarity of input data in the adaptive resonance topology network is quantified by the correlation entropy induced metric (CIM), and the input data is the new Pareto optimal solution generated by this generation of particle swarm iteratively updating the position. The calculation formula for the correlation entropy induced metric of two input data $a=(a_1, a_2, \ldots, a_D)$ and $b=(b_1, b_2, \ldots, b_D)$ is:

$$CIM(a, b, \sigma) = \left[\frac{1}{\sigma\sqrt{2\pi}}\left(1 - \frac{1}{D}\sum_{d=1}^{D} e^{\frac{(a_d-b_d)^2}{2\sigma^2}}\right)\right]^{\frac{1}{2}}$$

Among them, $\sigma$ represents the kernel bandwidth of the Gaussian kernel, D represents the dimension of the input data, and the smaller the value of the correlation entropy induced metric, the higher the similarity between the two data points.

Figure 4:
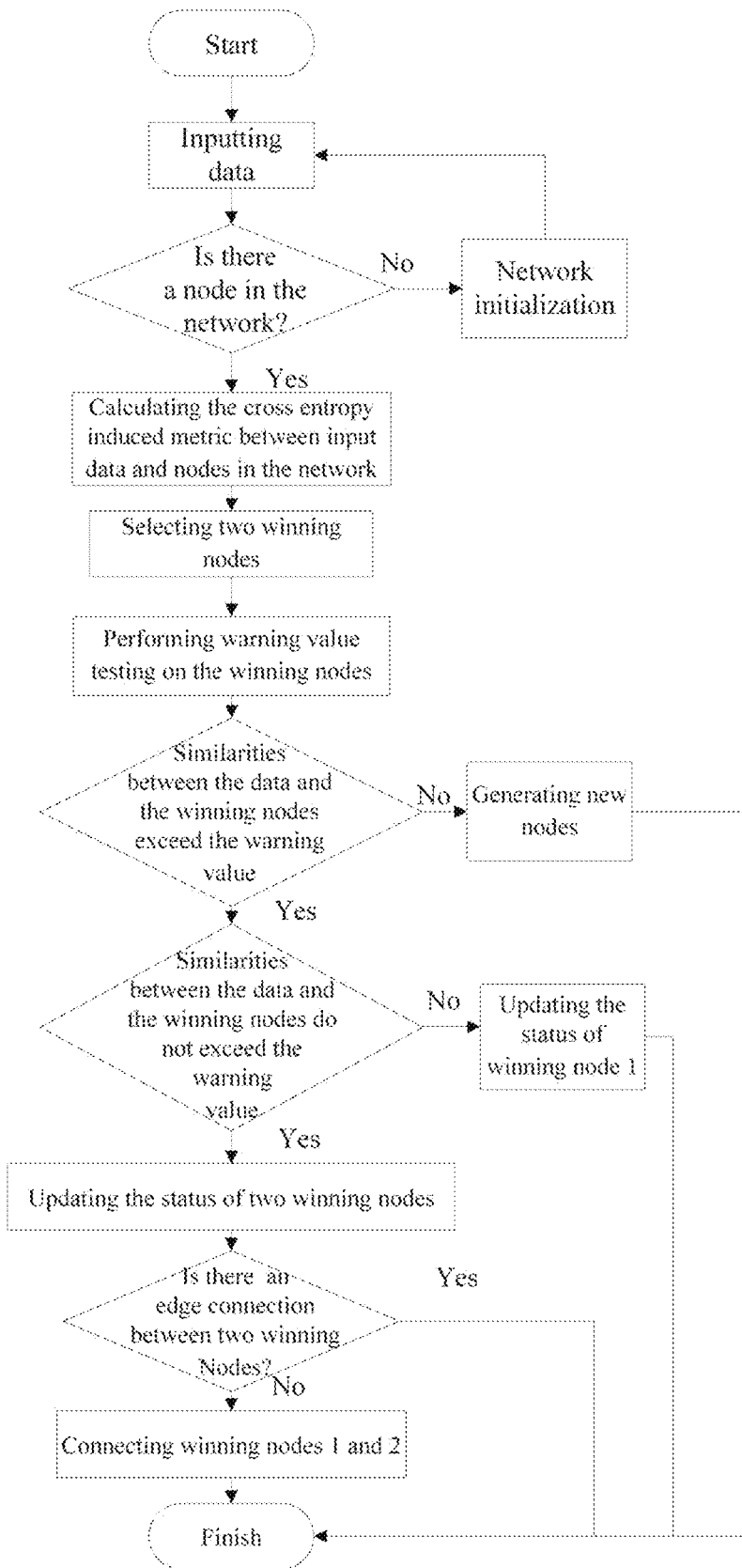
FIG. 4 shows the construction process of the adaptive resonance topology network in the multi-modal multi-objective testing data generation method based on topology adaptive resonance theory provided by the present disclosure.

The construction process of the adaptive resonance topology network is shown in FIG. 4, and the specific method is as follows:

(1) Initialization: in an initial stage of constructing the adaptive resonance topology network, since there are no nodes in the network, the first two data points in the input network become nodes directly, while the generation of other new nodes needs to be determined by calculating the entropy induced metric between the input data and the nodes. The calculation of the correlation entropy induced metric is influenced by a kernel bandwidth $\sigma$, which is a data related parameter estimated from the top H data in the input network:

$$\sigma_d = \left(\frac{4}{2+D}\right)^{\frac{1}{4+D}} S_d H^{-\frac{1}{4+D}}$$

among them, $\sigma_d$ is a d-th dimensional kernel bandwidth, $S_d$ represents a d-th dimensional sample standard deviation of H data points input into the adaptive resonance topology network, and a median of an array composed of the kernel bandwidths in each dimension is the node's kernel bandwidth σ.

(2) Winning node selection: when data point $x_i=(x_i^1, x_i^2, \ldots, x_i^D)$ is input into the adaptive resonance topology network, the correlation entropy induced metric between it and the existing node $Y=\{y_1, y_2, \ldots, y_j\}$ is first calculated, where $y_j=(y_j^1, y_j^2, \ldots, y_j^D)$, the winning node is selected based on a size of the correlation entropy induced metric:

$$w_1 = \arg\min_{y_j \in Y}[CIM(x_i, y_j, \sigma)]$$

$$w_2 = \arg\min_{y_j \in Y\setminus\{y_{w_1}\}} [CIM(x_i, y_j, \sigma)]$$

among them, $w_1$ and $w_2$ represent indexes of the first winning node and the second respectively, and parameter $y_{w_1}$ represents the first winning node.

(3) Warning value test: a similarity between the data point and the first and second winning nodes is represented as:

$$V_{w_1} = CIM(x_i, y_{w_1}, \sigma)$$

$$V_{w_2} = CIM(x_i, y_{w_2}, \sigma)$$

among them, $y_{w_2}$ represents the second winning node.

The similarity is compared with predefined warning value V and a relationship between data point and nodes is divided into following three situations:

$$V_{w_2} > V_{w_1} > V \quad \text{1)}$$

this situation means that the similarity between the data point and the winning node is greater than the warning value, that is, the winning node does not match the data point, and in this case, a new node needs to be generated, which is represented as:

$$y_{j+1} = x_j$$

$$V_{w_1} \le V < V_{w_2} \quad \text{2)}$$

this situation means that the data point matches the first winning node, but does not match the second winning node;

$$V_{w_1} \le V_{w_2} \le V \quad \text{3)}$$

this situation means that the data point matches the first and second winning nodes, a process of node learning and edge connection is performed;

(4) node learning and edge connection when the data point matches the node, the node state is updated, and if the first and second winning nodes satisfy situation 2), the position of the first winning node is updated using the following formula:

$$y_{w_1} = y_{w_1} + \frac{1}{M_{w_1}}(x_i - y_{w_1})$$

among them, $M_{w_1}$ is the number of data points belonging to node $y_{w_1}$. Whenever a new data point matches node $y_{w_1}$, $M_{w_1}$ is updated using the following formula:

$$M_{w_1} = M_{w_1} + 1$$

when the first and second winning nodes satisfy situation 3), nodes $y_{w_1}$ and $M_{w_1}$ update in the same way as situation 2), and if there is no edge connection between the first and second winning nodes, a new edge is generated to connect the first and second winning nodes, all neighboring nodes $y_{neighbor}$ connected to the first winning node $y_{w_1}$ through an edge are updated using the following formula:

$$y_{neighbor} = y_{neighbor} + \frac{1}{10M_{neighbor}}(x_i - y_{neighbor})$$

among them, $M_{neighbor}$ represents the number of data points belonging to node $y_{neighbor}$.

Figure 5:
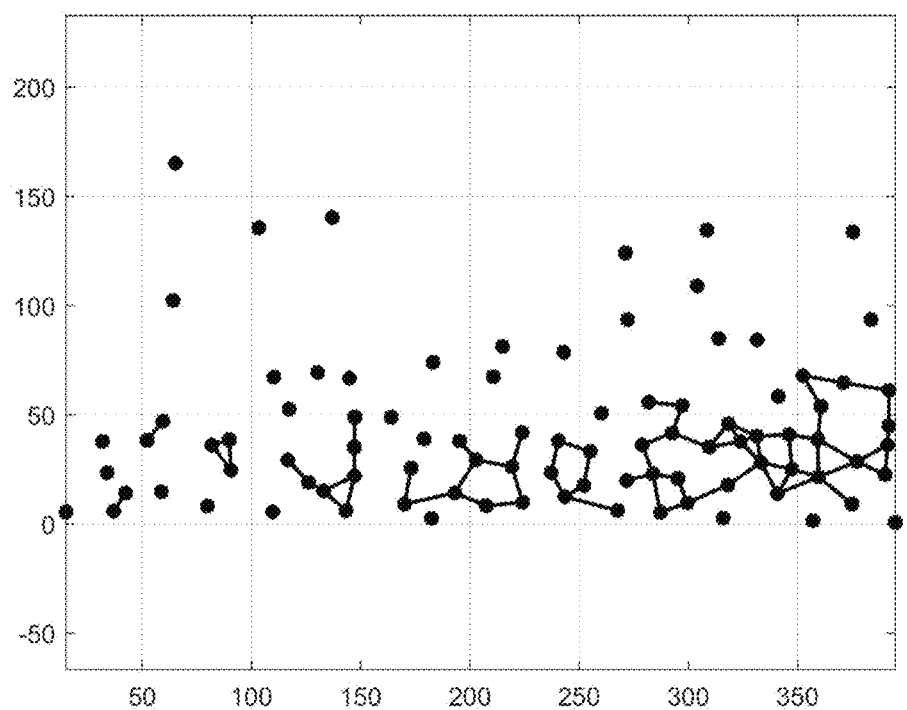
FIG. 5 shows the adaptive resonance topology network constructed in the embodiment of the multi-modal multi-objective testing data generation method based on topology adaptive resonance theory provided by the present disclosure.

Through the above four steps, an adaptive resonance topology network consisting of j nodes and G edges of connecting nodes can be constructed. This topology network can continuously update its number of nodes and node connection methods as new data is input, thereby reflecting the distribution of data more quickly and accurately. Here, the adaptive resonance topology network is used to learn the distribution of disturbance variable parameter combinations of multiple index thresholds that make the aircraft closer to a critical state of reliability and unreliability in the decision space, which provides neighborhood information for particle swarm updates, and thus more such disturbance variable parameter combinations are generated faster. The adaptive resonance topology network automatically constructed in this embodiment is shown in FIG. 5.

Step 6: updating a particle swarm position based on the updated adaptive resonance network topology and generating new testing data, which mainly includes the following steps:

(1) mapping the external set FA(t) to the adaptive resonance topology network and finding the node $y_j$ corresponding to the Pareto optimal solution in each external set;

(2) mapping particles to the adaptive resonance topology network, finding the belonging nodes of each particle, and then finding the neighboring node $\{y_j^1, y_j^2, \ldots, y_j^k\}$ of the belonging nodes of each particle based on the adaptive resonance topology network;

(3) forming a neighborhood solution set by the Pareto optimal solutions of the external set contained in the belonging nodes of each particle and the neighboring nodes of the belonging nodes, sorting solutions in the neighborhood solution set based on a crowding degree of the particle in the decision space and the corresponding function value in a target space, wherein a first ranked solution is a neighborhood optimal solution $X_{nbest_i}$ of the particle;

(4) sorting solutions in the individual optimal set of the particle according to a crowding degree, wherein a first ranked solution is an individual optimal solution $X_{pbest_i}$ of the particle; and (5) updating a velocity and a position of each particle based on its individual optimal solution and neighborhood optimal solution, and the update formula is as follows:

$$V_i(t+1) = w * V_i(t) + c_1 r_1 (X_{pbest_i} - X_i(t)) + c_2 r_2 (X_{nbest_i} - X_i(t))$$

$$X_i(t+1) = X_i(t) + V_i(t+1)$$

among them, $V_i(t+1)$ represents the velocity of the i-th particle in the t+1 generation, $X_i(t+1)$ represents the position of the i-th particle in the t+1 generation, $V_i(t)$ represents the velocity of the i-th particle in the t-th generation, $X_i(t)$ represents the position of the i-th particle in the t th generation, and $r_1$ and $r_2$ are two random variables within the range of (0,1).

In the above steps, the first three steps are to use the constructed adaptive resonance topology network to provide neighborhood information for the particle swarm, that is, to find the neighborhood solution set of each particle. The neighborhood solution contained in this solution set can guide the position update of each particle together with the individual optimal solution of each particle found in the fourth step, so that the particles can update their position towards multiple index thresholds that make the aircraft closer to a critical state of reliable and unreliable critical states. The new particle position is the testing data generated in this iteration, which is a combination of several values of direction and velocity of gusts that affect the flight state.

It should be Noted that:

The crowding distance in decision space refers to an index of the degree of crowding between a particle and its neighboring particle in the decision space. The larger the crowding distance, the more dispersed the distribution of particles, and the better it can ensure the diversity of solutions.

The crowding distance in the target space refers to the degree of crowding between the objective function value of a particle and the function value of its neighboring particle in the target space. The larger the crowding distance, the more dispersed the distribution of the objective function value of the particle, and the more diverse the solution in the target space.

Step 7: updating the testing data, inputting the updated testing dataset into the automatic testing environment, calculating multi-objective function values, and updating the test data archive, which is as follows:

The previous generation testing dataset TS(t) is replaced with the updated particle positions, an intersection of the testing dataset and the solutions in the test data archive is found, then the intersection part in the testing dataset is deleted to obtain a remaining part, and the remaining part is the updated testing dataset TS(t+1).

The updated testing dataset is input into an automatic testing environment constructed using JSBSim and Flight-Gear. The testing data generated through a multi-modal multi-objective particle swarm optimization algorithm based on adaptive resonance topology network, in this embodiment, are mainly combinations of two variable values of direction and velocity of gusts. For each combination of values input, the direction and velocity values will be modified at the corresponding positions in the flight script, with a fixed duration of disturbance. Then, JSBSim calculates the aircraft's flight attitude, altitude, and other state information based on the flight script, and outputs the required state index values, namely the altitude and angle of attack of the aircraft after disturbance ends. The output index values will be used to calculate the multi-objective function values, that is, the absolute value of the difference between the indexes and the index thresholds, and the smaller the absolute value of the difference, the closer the system's state is to an anomaly.

A tested current generation testing dataset TS(t+1) is put into a previous generation test data archive TA(t) to obtain an updated test data archive TA(t+1). The combination of all the direction and velocity values of gusts that affect the flight state of the aircraft that have been input to the automatic testing environment up to this iteration Step 8: updating the external set, learning set, and individual optimal set based on a non-dominated relationship of the updated particles, which is as follows:

The update process of the external set RA includes: merging all particles after updating the position into the external set EA(t), and performing fast non dominated sorting on the solutions in the external set, retaining the Pareto optimal solutions and removing the dominated solutions to obtain the current generation external set EA(t+1). The updated external set includes all combinations of direction and velocity values of altitude and angle of attack thresholds of gusts that make the aircraft closer to a critical state of reliability and unreliability, as of this iteration.

The update process of learning set LS includes: finding an intersection of the external set FA (t+1) of the current generation and the external set EA(t) of the previous generation, and then deleting the solutions of the intersection part of the external set of the current generation to obtain a remaining part which is the updated learning set LS(t+1). The updated learning set includes all newly generated combinations of direction and velocity values of altitude and angle of attack thresholds of gusts that make the aircraft closer to a critical state of reliability and unreliability, as of this iteration.

The update process of individual optimal set $Pbest_i$ includes: merging each particle $X_i(t+1)$ with the updated position into the previous generation individual optimal set $Pbest_i(t)$ of that particle, performing fast non dominated sorting on the individual optimal set of each particle, retaining the Pareto optimal solutions, and removing the dominated solutions to obtain the current generation individual optimal set $Pbest_i(t+1)$. The updated individual optimal set includes a combination of direction and velocity values of altitude and angle of attack thresholds of gusts that make the aircraft closer to a critical state of reliability and unreliability, as of this iteration.

The updated external set, learning set, and individual optimal set are used to guide the particle position update in the next iteration, that is, to guide the generation of the combination of direction and velocity values of gusts in the next iteration.

Step 9: repeating the update process of the adaptive resonance network, the particle swarm, and the external set until termination conditions are met, which is as follows:

As the particle swarm position is updated, the new learning set is input into the adaptive resonance topology network according to step 5 for incremental learning to update the topology structure of the adaptive resonance network. Then, according to steps 6-8, the particle position is updated, the testing data is input into the flight simulation automatic testing environment to obtain the altitude and angle of attack values of the aircraft under corresponding disturbance conditions, then the multi-objective function values are calculated, the external set, learning set, and individual optimal set are updated, and the testing data, that is, different combinations of direction and velocity values of gusts, are continuously iteratively generated, until the termination condition is met. In this embodiment, the termination condition is that the testing data in the test data archive meets the specified quantity of 500, that is, it terminates after executing 500 tests in the flight simulation automatic testing environment.

Figure 6:
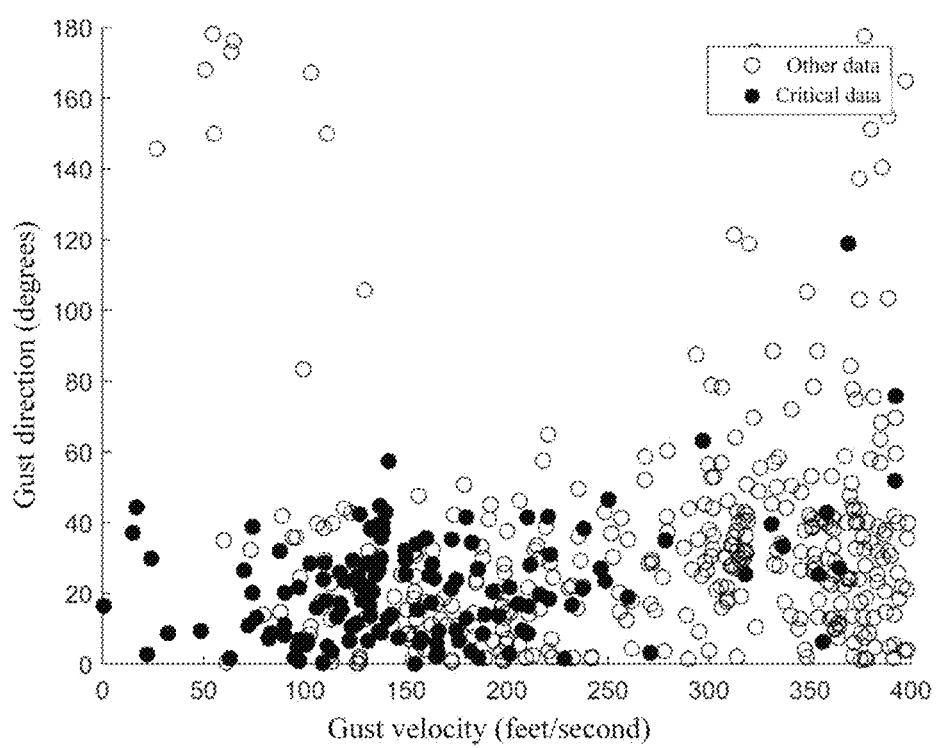
FIG. 6 shows the flight state data graph of the aircraft corresponding to the testing data generated by the multi-modal multi-objective testing data generation method based on topology adaptive resonance theory provided by the present disclosure.
Figure 7:
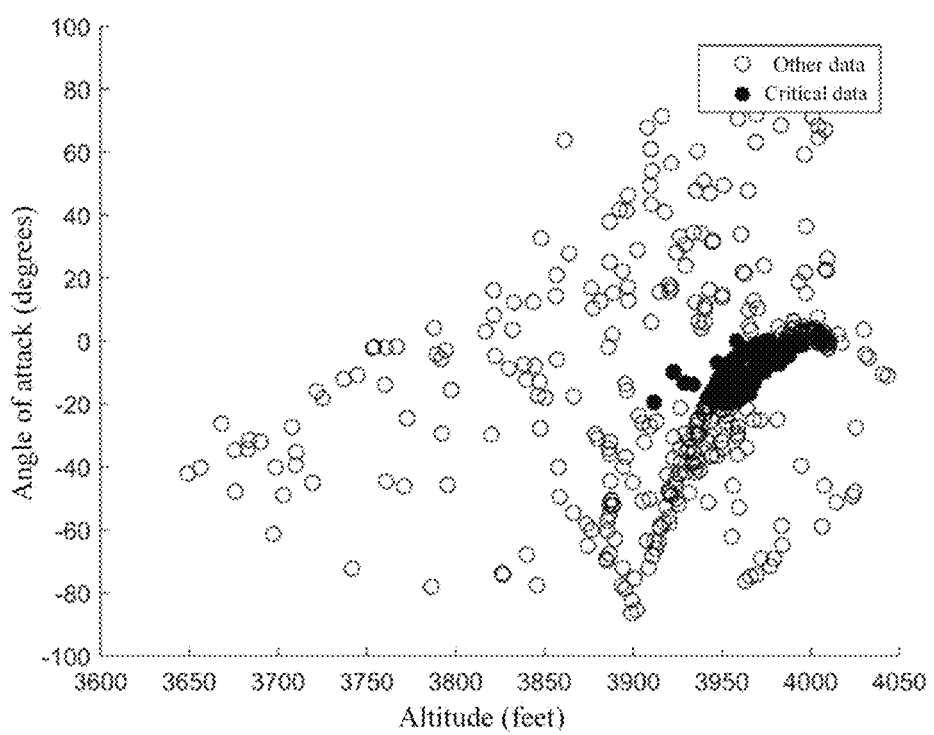
FIG. 7 shows the testing data graph generated by the multi-modal multi-objective testing data generation method based on topology adaptive resonance theory provided by the present disclosure.
Figure 8:
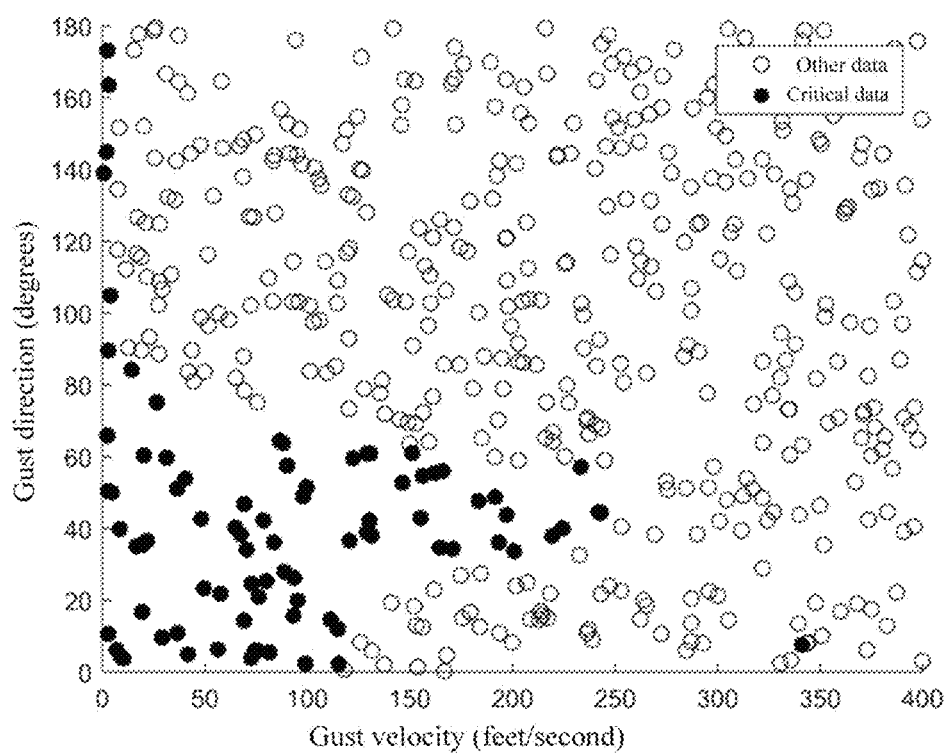
FIG. 8 shows the flight state data graph of the aircraft corresponding to the testing data generated based on a random algorithm provided by the present disclosure.
Figure 9:
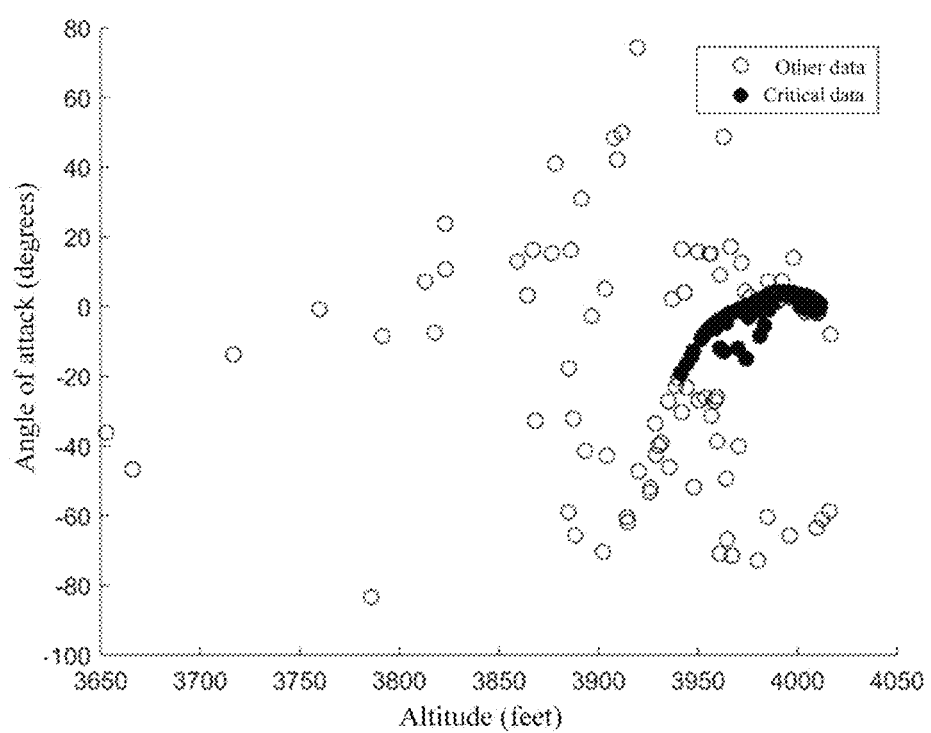
FIG. 9 shows the testing data graph generated based on a random algorithm provided by the present disclosure.

The testing data generated by the multi-modal multi-objective testing data generation method based on topology adaptive resonance theory and the corresponding output values of altitude and angle of attack obtained in the automatic testing environment are shown in FIG. 6 and FIG. 7. In FIG. 6, the horizontal axis represents the velocity of gusts, the vertical axis represents the direction of gusts, and in FIG. 7, the horizontal axis represents the altitude of the aircraft, and the vertical axis represents the angle of attack of the aircraft. Due to the initial cruising conditions of the aircraft set in this embodiment being an altitude of 4000 feet and an angle of attack of 1 degree, with a maximum altitude threshold of 100 feet and a maximum angle of attack threshold of 19 degrees, the more flight states tested at an altitude of 3900 feet to 4000 feet and an angle of attack of −20 degrees to 1 degree, the more advantageous it is to find the combination of direction and velocity values of altitude and angle of attack thresholds of gusts that make the aircraft closer to a critical state of reliability and unreliability; The solid circle in FIG. 7 represents all flight state data at altitudes of 3900 feet to 4000 feet and angles of attack of −20 degrees to 1 degree, corresponding to the combination of direction and velocity values of gusts represented by the solid circle in FIG. 6. In order to compare the distribution of the generated testing data, this embodiment also uses a random algorithm to randomly generate 500 combinations of angles and velocity values of gusts within the range of the horizontal angle between the gust and the flight direction of [0, 180] (in degrees) and the range of the gust velocity of [0, 400] (in feet/second), as shown in FIG. 8. These combinations are input into the automatic testing environment to obtain the corresponding flight state of the aircraft, as shown in FIG. 9. Similarly, in FIG. 9, solid circles are used to represent all flight state data at altitudes ranging from 3900 feet to 4000 feet and angles of attack ranging from −20 degrees to 1 degree. In FIG. 8, solid circles are used to represent the testing data for achieving this flight state, that is, the corresponding combination of direction and velocity values of gusts. By comparison, it can be seen that the testing data generated using the multi-modal multi-objective testing data generation method based on topology adaptive resonance theory, which generates 500 sets of testing data, can find more combinations of direction and velocity values of altitude and angle of attack thresholds of gusts that make the aircraft closer to a critical state of reliability and unreliability compared to the testing data generated using the random algorithm. The specific statistical data is that in the testing data generated using the multi-modal multi-objective testing data generation method based on topology adaptive resonance theory, there are 142 data that can enable altitudes to range from 3900 feet to 4000 feet and angles of attack to range from −20 to 1 degrees in flight states, while in the testing data generated using the random algorithm, there are only 84 such data. Obviously, the testing data generated by the multi-modal multi-objective testing data generation method based on topology adaptive resonance theory can find more combinations of direction and velocity values of altitude and angle of attack thresholds of gusts that make the aircraft closer to a critical state of reliability and unreliability in the same testing data scale compared to the testing data generated by the random algorithm. Moreover, the testing data obtained near the index thresholds is more concentrated, greatly improving the testing efficiency. This has certain significance for improving the reliability and safety of aircraft flight.

The present disclosure proposes a multi-modal multi-objective testing data generation method based on topology adaptive resonance theory. Firstly, the method regards the problem of finding out what kind of external disturbance or system fault will approach the thresholds of unreliable flight state indexes during flight as a multi-mode multi-objective optimization black box optimization testing problem. Compared with traditional methods, it can more comprehensively identify all disturbance or attack parameter combinations that cause the aircraft to approach unreliable flight state. Then, a multi-modal multi-objective particle swarm optimization algorithm based on adaptive resonance topology network is used to generate testing data. Compared with traditional self-organizing mapping methods, this algorithm does not need to define the network topology structure in advance. Instead, it learns the distribution of Pareto optimal solution sets incrementally through the adaptive resonance topology network, providing neighborhood information for iterative updates of particles, further guiding the update direction of particle swarm. The test data archive is used to save all testing data input into the system for testing, avoiding duplicate testing and improving testing efficiency. The Pareto optimal solutions from the updated particles are input into the adaptive resonance topology network for learning and updating the network, so that the topology structure of the network becomes closer to the distribution of the true Pareto optimal solution set with the iteration of the particle swarm, while ensuring the convergence of the algorithm and exploring the diversity of solutions in the decision space. Finally, the present disclosure is capable of quickly identifying the boundary values of disturbance variables that distinguish between reliable and unreliable flight states with less testing data and shorter testing time, in situations where certain systems have no explicit expressions, gradient information cannot be obtained, variable spatial distribution is wide and high-dimensional, testing times are limited, or testing costs are expensive, thereby improving the reliability and safety of aircraft flight.

What is claimed is:

1. A multi-modal multi-objective testing data generation method based on topology adaptive resonance theory, comprising following steps:

Step 1: determining disturbance variables that affect flight state and their range of values, as well as a plurality of indexes and their thresholds used to distinguish the flight state;

Step 2: transforming a testing problem into a multi-modal multi-objective black box optimization testing problem and building an automatic testing environment; wherein a structure and control law of an aircraft to be tested is ignored, and its output is observed only based on different inputs, the inputs are parameter combinations of various disturbance variables or system faults encountered by the aircraft during flight, the output is index values of the flight state, a degree of disturbance or what kind of faults will cause the aircraft to be unreliable or unsafe is considered as a black box optimization testing problem, a plurality of flight state indexes close to their respective unreliable or unsafe thresholds are set as an optimization objective, and values of the disturbance variables are set as a decision space; the automatic testing environment consists of three parts: test control module, test execution module, and test result collection module;

Step 3: setting relevant parameters of a particle swarm optimization algorithm and initializing the particle swarm; wherein the relevant parameters of the particle swarm optimization algorithm comprise: number of particles N, particle dimension D, inertia factor ω, learning factors $c_1$ and $c_2$;

Step 4: building a test data archive TA, a testing dataset TS, an external set EA, a learning set LS, and an individual optimal set $Pbest_i$;

Step 5: inputting the learning set into an adaptive resonance topology network and updating a topology structure of the adaptive resonance network; wherein a similarity of input data in the adaptive resonance topology network is quantified by a correlation entropy induced metric (CIM), the input data is a new Pareto optimal solution produced by the particle swarm iteratively updating the position, a calculation formula for the correlation entropy induced metric of two input data $a=(a_1, a_2, \ldots, a_D)$ and $b=(b_1, b_2, \ldots, b_D)$ is:

$$CIM(a, b, \sigma) = \left[\frac{1}{\sigma\sqrt{2\pi}}\left(1 - \frac{1}{D}\sum_{d=1}^{D} e^{\frac{(a_d b_d)^2}{2\sigma^2}}\right)\right]^{\frac{1}{2}}$$

among them, σ represents a kernel bandwidth of a Gaussian kernel, D represents a dimension of the input data, and the smaller the value of the correlation entropy induced metric, the higher the similarity between the two input data;

Step 6: updating a particle swarm position based on the updated adaptive resonance network topology and generating new testing data; wherein this step comprises:

(1) mapping the external set to the adaptive resonance topology network and finding nodes corresponding to the Pareto optimal solution in each external set;

(2) mapping particles to the adaptive resonance topology network, finding belonging nodes of each particle, and then finding neighboring nodes of the belonging nodes of each particle based on the adaptive resonance topology network;

(3) forming a neighborhood solution set by the Pareto optimal solutions of the external set contained in the belonging nodes of each particle and the neighboring nodes of the belonging nodes, sorting solutions in the neighborhood solution set based on a crowding degree of the particle in the decision space and the corresponding function value in a target space, wherein a first ranked solution is a neighborhood optimal solution $X_{nbest_i}$ of the particle;

(4) sorting solutions in the individual optimal set of the particle according to a crowding degree, wherein a first ranked solution is an individual optimal solution $X_{pbest_i}$ of the particle; and (5) updating a velocity and a position of each particle based on its individual optimal solution and neighborhood optimal solution;

Step 7: updating the testing data, inputting the updated testing dataset into the automatic testing environment, calculating multi-objective function values, and updating the test data archive; wherein the previous generation testing dataset TS(t) is replaced with the updated particle positions, an intersection of the testing dataset and the solutions in the test data archive is found, then the intersection part in the testing dataset is deleted to obtain a remaining part, and the remaining part is the updated testing dataset TS(t+1);

Step 8: updating the external set, learning set, and individual optimal set based on a non-dominated relationship of the updated particles; and Step 9: repeating the update process of the adaptive resonance network, the particle swarm, and the external set until termination conditions are met;

wherein in step 5, the learning set is used to store a new Pareto optimal solution generated by the iteration of the particle swarm after updating the position, that is, a disturbance variable parameter combination of a plurality of index thresholds that make the aircraft closer to a critical state of reliability and unreliability, and a construction and update process of the adaptive resonance topology network comprises following steps:

(1) initialization: in an initial stage of constructing the adaptive resonance topology network, since there are no nodes in the network, the first two data points in the input network become nodes directly, the input data is the Pareto optimal solution in the learning set, which is the disturbance variable parameter combination of a plurality of index thresholds that make the aircraft closer to a critical state of reliability and unreliability; the generation of other new nodes needs to be determined by calculating the entropy induced metric between the input data and the nodes; the calculation of the correlation entropy induced metric is influenced by a kernel bandwidth σ, which is a data related parameter estimated from the top H data in the input network:

$$\sigma_d = \left(\frac{4}{2+D}\right)^{\frac{1}{4+D}} S_d H^{-\frac{1}{4+D}}$$

among them, $\sigma_d$ is a d-th dimensional kernel bandwidth, $S_d$ represents a d-th dimensional sample standard deviation of H data points input into the adaptive resonance topology network, and a median of an array composed of the kernel bandwidths in each dimension is the node's kernel bandwidth σ;

(2) winning node selection: when data point $x=(x_i^1, x_i^2, \ldots, x_i^D)$ is input into the adaptive resonance topology network, the correlation entropy induced metric between it and the existing node $Y=\{y_1, y_2, \ldots, y_j\}$ is first calculated, where $y_j=(y_j^1, y_j^2, \ldots, y_j^D)$, the winning node is selected based on a size of the correlation entropy induced metric:

$$w_1 = \arg\min_{y_j \in Y}[CIM(x_i, y_j, \sigma)]$$

$$w_2 = \arg\min_{y_j \in Y \setminus \{y_{w_1}\}} [CIM(x_i, y_j, \sigma)]$$

among them, $w_1$ and $w_2$ represent indexes of the first winning node and the second respectively, and parameter $y_{w_1}$ represents the first winning node;

(3) warning value test: a similarity between the data point and the first and second winning nodes is represented as:

$$V_{w_1} = CIM(x_i, y_{w_1}, \sigma)$$
$$V_{w_2} = CIM(x_i, y_{w_2}, \sigma)$$

among them, $y_{w_2}$ represents the second winning node;

the similarity is compared with predefined warning value V and a relationship between data point and nodes is divided into following three situations:

$$V_{w_2} > V_{w_1} > V \quad \quad 1)$$

the similarity between the data point and the winning node is greater than the warning value, which means that the winning node does not match the data point, and in this case, a new node needs to be generated, which is represented as:

$$y_{j+1} = x_j$$
$$V_{w_1} \le V < V_{w_2} \quad \quad 2)$$

the data point matches the first winning node, but does not match the second winning node;

$$V_{w_1} \le V_{w_2} \le V \quad \quad 3)$$

the data point matches the first and second winning nodes, a process of node learning and edge connection is performed;

(4) node learning and edge connection when the data point matches the node, the node state is updated, and if the first and second winning nodes satisfy situation 2), the position of the first winning node is updated using the following formula:

$$y_{w_1} = y_{w_1} + \frac{1}{M_{w_1}}(x_i - y_{w_1})$$

among them, $M_{w_1}$ is the number of data points belonging to node $y_{w_1}$, whenever a new data point matches node $y_{w_1}$, $M_{w_1}$ is updated using the following formula:

$$M_{w_1} = M_{w_1} + 1$$

when the first and second winning nodes satisfy situation 3), nodes $y_{w_1}$ and $M_{w_1}$ are updated in the same way as situation 2), and if there is no edge connection between the first and second winning nodes, a new edge is generated to connect the first and second winning nodes, all neighboring nodes $y_{neighbor}$ connected to the first winning node $y_{w_1}$ through an edge are updated using the following formula:

$$y_{neighbor} = y_{neighbor} + \frac{1}{10 M_{neighbor}}(x_i - y_{neighbor})$$

among them, $M_{neighbor}$ represents the number of data points belonging to node $y_{neighbor}$.

2. The multi-modal multi-objective testing data generation method based on topology adaptive resonance theory of claim 1, wherein in step 1, D disturbance variables $var_1$, $var_2$, ..., $var_D$, that can affect an operational state of the aircraft are obtained based on an actual operating environment of the aircraft; among them, $var_1 \in [var_{1min}, var_{1max}]$, $var_2 \in [var_{2min}, var_{2max}]$, ..., $var_D \in [var_{Dmin}, var_{Dmax}]$; then M relevant indexes $\{obj_1, obj_2, \ldots, obj_M\}$ that can reflect changes in flight state are obtained; when one of the indexes reaches its threshold, the flight state transitions from a reliable or safe state to an unreliable or unsafe state, and the threshold of each index is determined by relevant requirements for the reliable and safe operation of the aircraft.

3. The multi-modal multi-objective testing data generation method based on topology adaptive resonance theory of claim 1, wherein in step 2, to construct a multi-modal multi-objective black box optimization problem, generally speaking, the problem is expressed as follows:

$$\text{Min } F(\text{var}) = \{f_1(\text{var}), f_2(\text{var}), \ldots, f_M(\text{var})\}$$
$$\text{s.t. var} = (\text{var}_1, \text{var}_2, \ldots, \text{var}_D) \in \Omega$$

among them, F represents a proximity function between the flight state and the unreliable state boundary, the smaller the value of F, the closer the flight state is to the unreliable state, at the edge of impending anomalies, the flight state is determined by various flight state indexes f (var), M represents the number of targets to be optimized, that is, the number of flight state indexes; var represents a D-dimensional vector in the decision space $\Omega$, that is, a vector composed of D disturbance variables or system fault factors.

4. The multi-modal multi-objective testing data generation method based on topology adaptive resonance theory of claim 1, wherein in step 2, the test control module is responsible for obtaining the testing data generated by the optimization algorithm, the test execution module inputs the testing data into the system to execute the test, and the test result collection module collects corresponding test results of each testing data, and feeds the results back to the optimization algorithm.

5. The multi-modal multi-objective testing data generation method based on topology adaptive resonance theory of claim 1, wherein in step 3, N particles are randomly generated in the decision space of D dimension, and velocity $V_i$ and position $X_i$ of the i-th particle are initialized, wherein $V_i = (V_i^1, V_i^2, \ldots, V_i^D)$, $X_i = (var_i^1, var_i^2, \ldots, var_i^D)$, and the positions of the particles correspond to the values of the disturbance variable combination during flight process.

6. The multi-modal multi-objective testing data generation method based on topology adaptive resonance theory of claim 1, wherein in step 4, in an initial stage before starting iteration, empty sets of each archive and set are established, and then all initialized particle positions are input into the test data archive, the testing dataset, the external set and the learning set, that is, TA={$X_1, X_2, \ldots, X_i, X_N$}, TS={$X_1, X_2, \ldots, X_i, \ldots, X_N$}, EA={$X_1, X_2, \ldots, X_i, \ldots, X_N$}, LS={$X_1, X_2, \ldots, X_i, X_N$}, then the position of each particle is input into their own individual optimal set, that is, Pbest$_1$, ={$X_1$}, Pbest$_2$={$X_2$}, . . . , Pbest$_i$={$X_i$}, . . . , Pbest$_N$={$X_N$}, and each archive and set is updated accordingly as the particle swarm updates.

7. The multi-modal multi-objective testing data generation method based on topology adaptive resonance theory of claim 1, wherein in step 6, an update formula is as follows:

$$V_i(t+1) = w * V_i(t) + c_1 r_1 (X_{pbest_i} - X_i(t)) + c_2 r_2 (X_{nbest_i} - X_i(t))$$

$$X_i(t+1) = X_i(t) + V_i(t+1)$$

among them, $V_i(t+1)$ represents a velocity of the i-th particle in the t+1 generation, $X_i(t+1)$ represents a position of the i-th particle in the t+1 generation, $V_i(t)$ represents a velocity of the i-th particle in the t generation, $X_i(t)$ represents a position of the i-th particle in the t generation, and $r_1$ and $r_2$ are two random variables within a range of (0,1).

8. The multi-modal multi-objective testing data generation method based on topology adaptive resonance theory of claim 1, wherein in step 7, the updated testing dataset is input into the automatic testing environment, and actual operating results of the testing data are obtained through automatic testing execution, that is, a combination of values of different flight disturbance factors or system faults is input into flight simulation software to obtain the values of a plurality of flight state indexes under the influence of the disturbance or fault conditions, the results are used to calculate the values of the multi-objective function, that is, an absolute difference between the values of a plurality of flight state indexes and the corresponding unreliable thresholds of the flight state indexes;

a tested current generation testing dataset TS(t+1) is put into a previous generation test data archive TA (t) to obtain an updated test data archive TA (t+1); all disturbance variable parameter combinations that affect the flight state of the aircraft that have been input into the automatic testing environment for testing up to this iteration.

9. The multi-modal multi-objective testing data generation method based on topology adaptive resonance theory of claim 1, wherein in step 8, an update process of the external set EA is as follows: merging all particles after updating the position into the external set, and quickly non dominated sorting the solutions in the external set, retaining the Pareto optimal solutions and removing the dominated solutions; wherein the updated external set comprises all disturbance variable parameter combinations of a plurality of index thresholds that make the aircraft closer to a critical state of reliability and unreliability, as of this iteration;

an update process of learning set LS is as follows: finding an intersection of the external set EA(t+1) of the current generation and the external set EA(t) of the previous generation, and then deleting the solutions of the intersection part of the external set of the current generation to obtain a remaining part which is the updated learning set; wherein the updated learning set comprises all newly generated disturbance variable parameter combinations of a plurality of index thresholds that make the aircraft closer to a critical state of reliability and unreliability, as of this iteration;

an update process of individual optimal set Pbest$_i$ is as follows: merging each particle with the updated position into the individual optimal set of that particle, performing fast non dominated sorting on the individual optimal set of each particle, retaining the Pareto optimal solutions, and removing the dominated solutions; wherein the updated individual optimal set comprises disturbance variable parameter combinations of a plurality of index thresholds that make the aircraft closer to a critical state of reliability and unreliability in the historical position of the particle, as of this iteration.

* * * * *